Oct. 23, 1956

H. G. CRAM 2,767,841

CENTRIFUGAL SEPARATOR

Filed May 3, 1952

INVENTOR
HERVEY G. CRAM

BY

*Young Wright*

ATTORNEYS

Oct. 23, 1956  H. G. CRAM  2,767,841
CENTRIFUGAL SEPARATOR
Filed May 3, 1952.  4 Sheets—Sheet 3

INVENTOR
HERVEY G. CRAM

BY
*Young and Wright*
ATTORNEYS

Oct. 23, 1956    H. G. CRAM    2,767,841
CENTRIFUGAL SEPARATOR
Filed May 3, 1952    4 Sheets-Sheet 4

INVENTOR
HERVEY G. CRAM

BY
Young and Wright
ATTORNEYS

United States Patent Office 2,767,841
Patented Oct. 23, 1956

2,767,841

CENTRIFUGAL SEPARATOR

Hervey G. Cram, Appleton, Wis., assignor to Combined Locks Paper Co., Combined Locks, Wis.

Application May 3, 1952, Serial No. 285,886

5 Claims. (Cl. 209—155)

This invention appertains to a device of the type shown in my pending application for patent Serial Number 202,788 filed December 26, 1950, now Patent No. 2,718,179, for recovering desired usable material from waste liquid capable of use in various lines of industry, but more particularly designed for use in connection with the manufacture of paper.

For the purpose of clarification, the following describes the advantages and objects of the invention in connection with the manufacture of paper.

The primary objects of this invention are; the separation while in dilute liquid suspension of, solids of different specific gravity, or the separation of the solids from the liquid of suspension continuously by mechanical means, as follows:

1. The separation of solids of different specific gravity while in dilute liquid suspension.

This provides the means for the separation and the elimination of objectionable foreign material from the acceptable pulp or paper stock of a different specific gravity at any point in its preparation while in dilute liquid suspension.

2. The separation of solids from the liquid of suspension where the solids are of a different specific gravity than the liquid of suspension.

This provides the means for the separation of the "fines" in the dilute liquid suspension, such as, the filtrate from the pulp thickeners (white water) with the recovery thereof of the acceptable material, and the re-use of the clear water for the dilution of the pulp previous to screening, or, its discharge to waste of a surplus without stream pollution.

3. The separation of certain objectionable materials from the acceptable material in dilute liquid suspension by frictional adhesion.

Certain objectionable material, such as, asphalt, cellophane, etc. which is especially prevalent in converted paper stock, has a tendency to adhere while under pressure, to a metal surface, sufficiently to effect a separation from the acceptable paper stock, and with this in mind, the separator is so designed as to present a maximum of metal surface to the paper stock in its passage through the machine.

Due to the increased cost and scarcity of wood for the manufacture of paper, more and more waste paper is being utilized and beaten into paper pulp or stock for re-use. This waste paper contains much foreign matter, such as ink, cellophane, asphalt, etc., and consequently, it is necessary to remove this foreign matter from the converted paper stock before such stock can be utilized in the making of the new paper sheet.

It is, therefore, another salient object of this invention, as brought out in numbered paragraph three, to provide a centrifugal separator so constructed and arranged as to provide a large area of metal surface past which the stock flows, the machine embodying a series of runners having novelly formed rims constituting baffles against which the stock impinges as it flows through the machine.

A further important object of the invention is the provision of a centrifugal separator including a body through which passes longitudinally the liquid containing material to be reclaimed, and a plurality of like runners rotatably mounted in the body for rapidly rotating the liquid, each of the runners including a rim having side baffle plates converging toward the periphery of the runners and a disc shaped baffle plate disposed centrally between the side baffle plates, the side baffle plates of the rim and the central flat baffle plate forming a tortuous passage through the machine to insure the proper flow of the liquid past the surfaces of the side baffle plates and the central baffle plate to provide a maximum amount of surface against which certain foreign matter will adhere.

A still further object of the invention is the provision of escape openings in the runners adjacent to the axis thereof for reclaimed material of low specific gravity and an annular escape slot at the periphery of each runner and at the juncture of the converging rim side baffle plates for the escape of objectionable material of higher specific gravity.

A still further important object of the invention is the provision of means for creating a desired pressure by the liquid on the runners so as to insure the engagement of objectionable material with surfaces of the runners.

With these and other objects in view, the invention consists in the novel construction, arrangement and formation of parts, as will be hereinafter more specifically described and claimed, and illustrated in the accompanying drawings, in which drawings:

Figure 1:
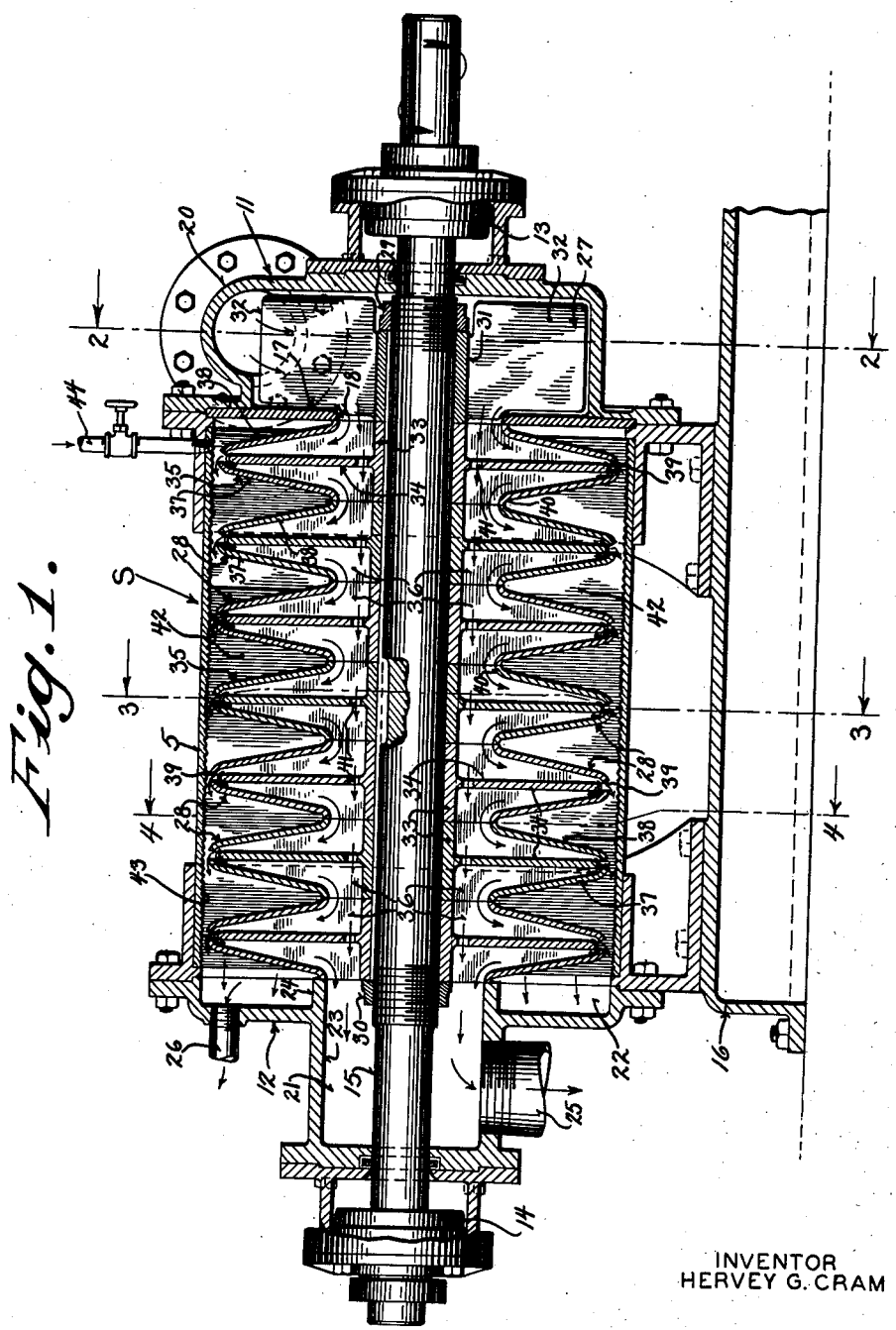
Figure 1 is a longitudinal sectional view through my improved separating machine, the section being taken on the line 1—1 of Figure 2, looking in the direction of the arrows, the view illustrating the general arrangement of parts and the novel formation of the runners.

Referring to the drawings in detail, wherein similar reference characters designate corresponding parts throughout the several views the letter S generally indicates the improved separating machine, and the same includes a cylindrical body 5. Secured to the opposite terminals of the body 5, is an intake head 11 and a discharge head 12. These heads 11 and 12 carry suitable bearings 13 and 14 for a main operating shaft 15, which extends axially through the body 5 and heads 11 and 12. This shaft 15 is directly driven from a suitable motor, not shown. The body 5 with the heads 11 and 12 can be fastened to a suitable base 16. This base, in turn, can be fastened to a floor or other support. While I have shown the machine lying in a horizontal plane, it is to be understood that the same can function in a vertical plane.

Figure 2:
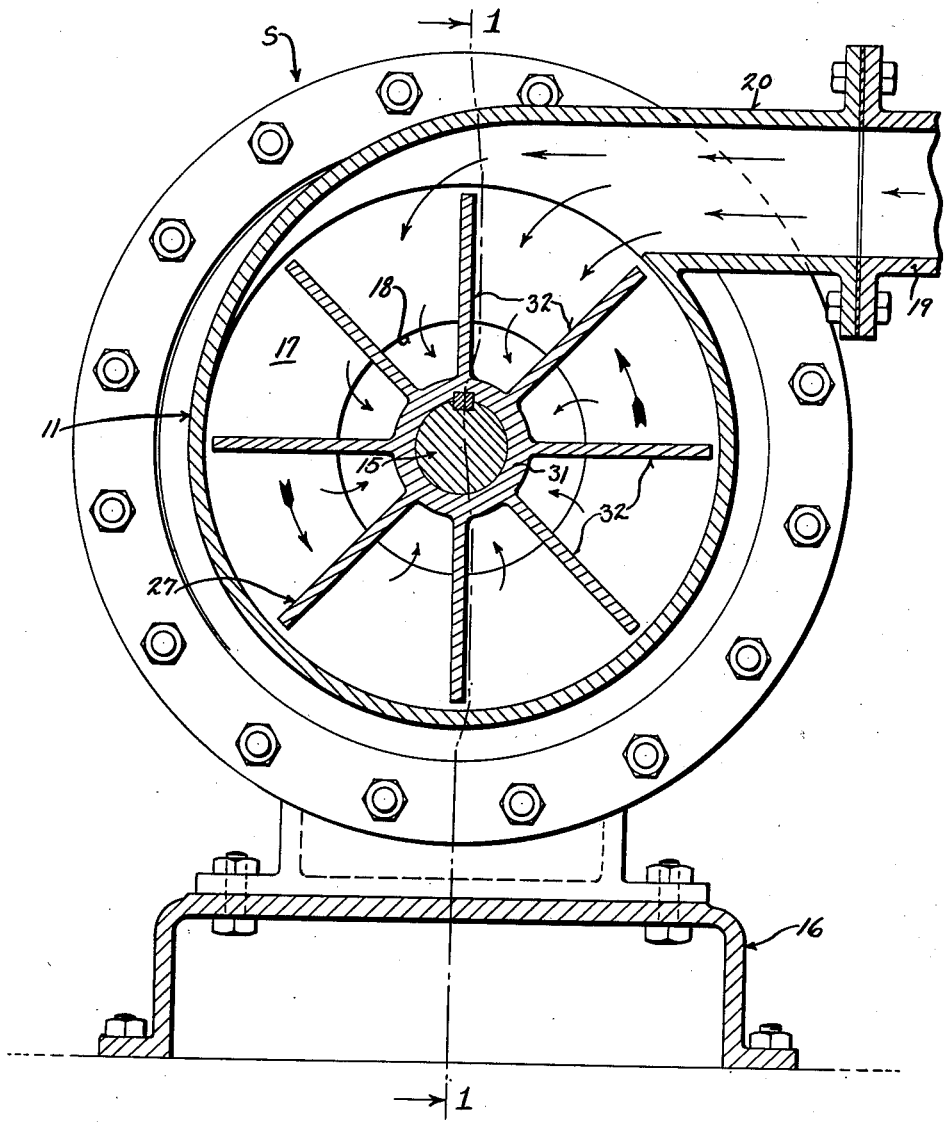
Figure 2 is a transverse sectional view through the machine taken on the line 2—2 of Figure 1 looking in the direction of the arrows and illustrating more particularly the agitator or beater in the intake chamber for initially transmitting rotative movement to the liquid in the direction of rotation of the runners, the view being taken on a larger scale than Figure 1.

The intake head 11 is separated from the body 5 by an end wall 17 having an axial opening 18 surrounding the shaft 15 which defines a restricted inlet from the head 11 to the body 5 for the stock or liquid. Communicating with the intake head 11 is a delivery pipe 19 for the liquid and it is to be noted that this pipe is securely fastened to the intake 20 for the head, which intake is tangentially arranged relative to the head, as best shown in Figures 1 and 2.

The discharge head 12 is provided with an inner discharge chamber 21 for accepted material, and an outer annular discharge chamber 22 for rejected material. The inner chamber 21 is separated from the outer annular chamber 22 by a cylindrical wall 23 a portion of which projects inwardly toward the body 5, as at 24, for a purpose which will later appear. Communicating with the inner discharge chamber 21 is a discharge pipe 25 and communicating with the outer chamber 22 is a discharge pipe 26. The pipes, 19, 25 and 26 can be valve controlled as shown in my mentioned pending application, and for the purpose set forth in said application. Likewise, it is to be understood that my separating machine can be used in the same system as illustrated in Figure 7 of the said application.

Fixed to the shaft 15 is an impeller 27 arranged within the intake head 11, so as to rotate within the intake chamber. Also fixed to the shaft 15 are a plurality of like runners 28, all arranged in abutting relation. The impeller 27 and the runners 28 are preferably keyed to the shaft 15 and fixed longitudinally by means of clamping nuts 29 and 30 threaded on the shaft 15.

The impeller 27 includes a hub 31 and a plurality of radially extending blades 32. The liquid, pulp or paper stock is delivered into the intake chamber of the intake head tangentially into the field of the impeller 27, and the impeller rotates directionally with the tangential delivery of the stock and this will have a minimizing effect on the power required from the direct drive motor proportional to the hydrostatic head on the supply of liquid or stock. The constant rate of rotation of the impeller 27 delivers the stock to the body 5 at an equivalent rate of rotation to that of the runners 28.

Figure 3:
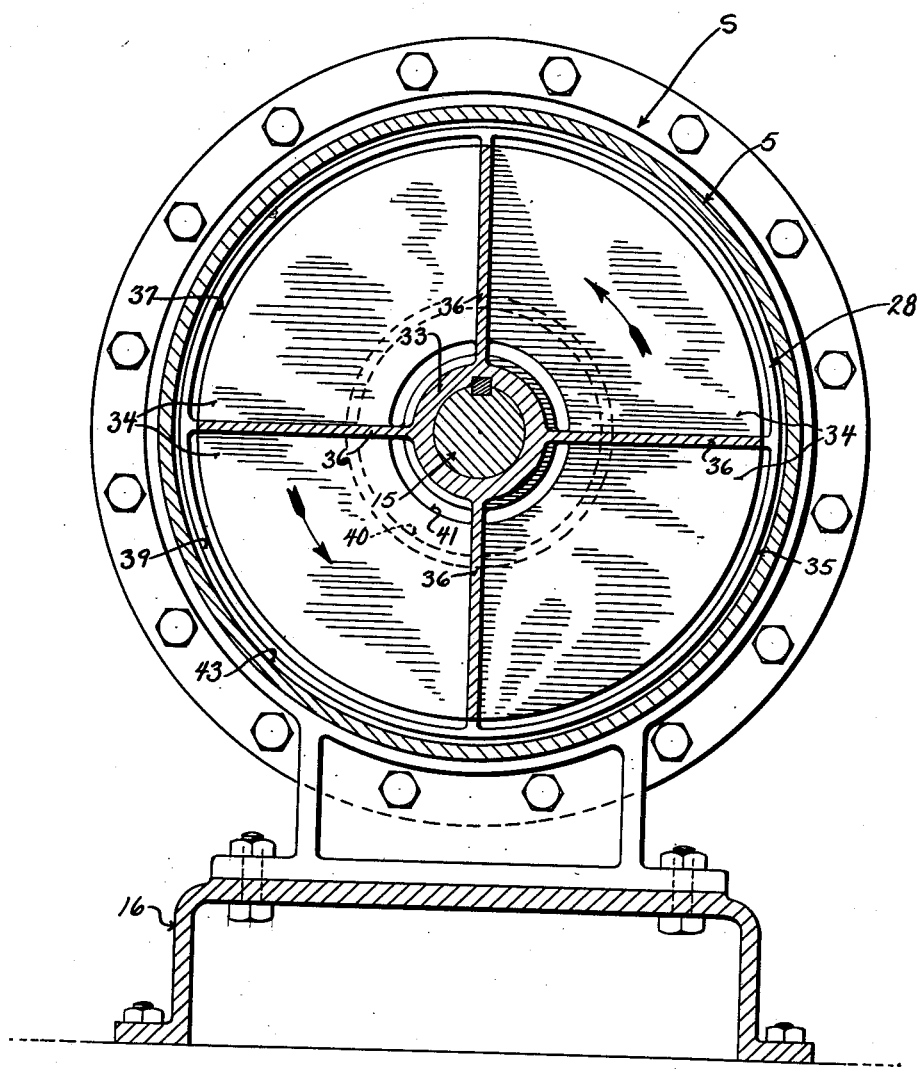
Figure 3 is a transverse sectional view through the machine taken on the line 3—3 of Figure 1, looking in the direction of the arrows and illustrating in particular the construction of a runner, the figure being on the same scale as Figure 2.
Figure 4:
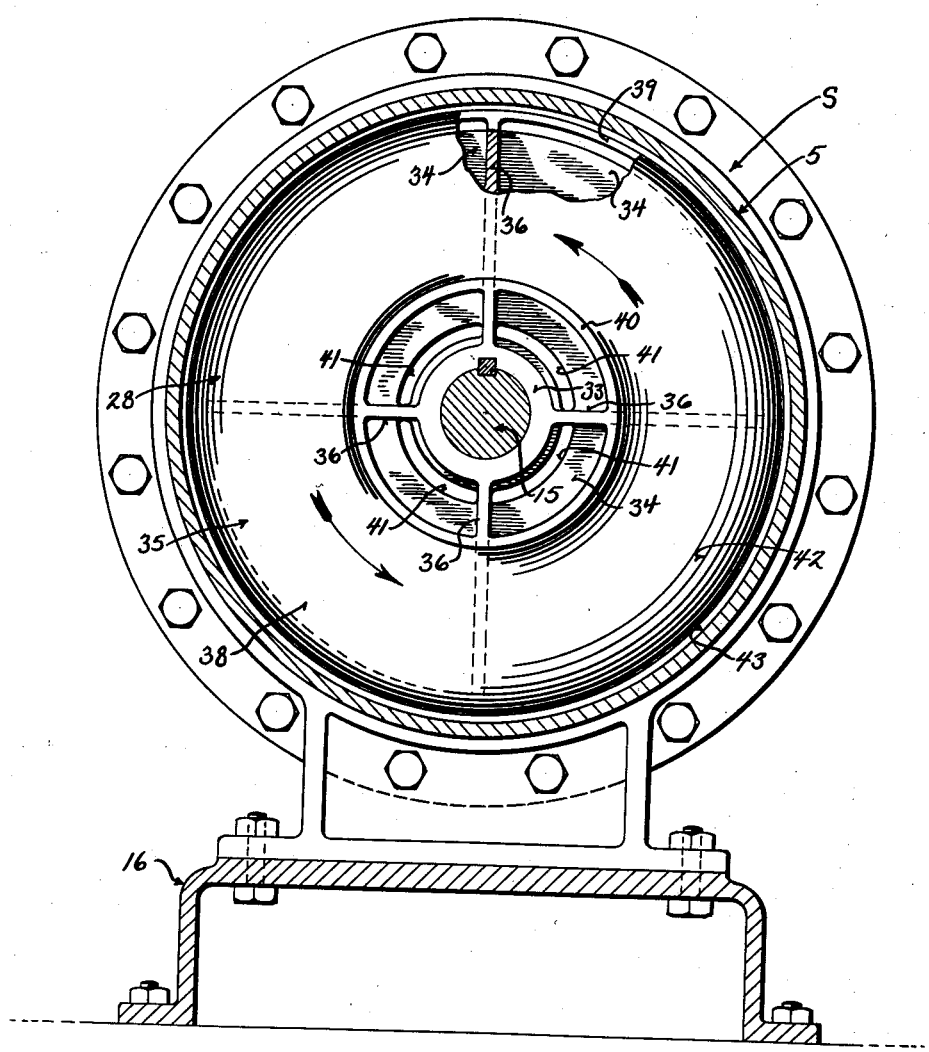
Figure 4 is a transverse sectional view through the machine taken on the line 4—4 of Figure 1, looking in the direction of the arrows and showing one of the runners in end elevation, the view being on the same scale as Figures 2 and 3.

Each of the runners 28 includes a hub 33, a disc shaped central baffle plate 34 and a rim 35. At certain points (see Figure 3), the hub, the baffle plate 34 and the rim 35 are connected by cross impeller blades 36. Each rim includes side baffle plates 37 and 38 which gradually converge toward the periphery of the rim of a runner. At the juncture of the side baffle plates 37 and 38 of the rim, the rim is provided with an annular outlet slot 39 for material of high specific gravity and the outer edge or periphery of the central plate 34 lies inward of this slot and between the side baffle plates 37 and 38. The inner edges of the baffle plates 37 and 38 are curved outwardly in opposite directions, as at 40, in spaced relation to the hub 33. These portions of the rims are arranged in abutting relation, as best shown in Figure 1, for a purpose which will also later appear. The curved portions 40 of the end runners engage respectively the division wall 17 for the intake head 11 and the projecting portion 24 of the cylindrical wall 23 of the discharge head 12. The central baffle plate 34 of each runner is provided with a series of passageways 41 for material of lower specific gravity.

The runners 28 are of such a diameter as to provide for a circumferential chamber 42 between the outer periphery of the runners and the inside periphery of the body 5 for the flow of material of high specific gravity. The inner periphery of the body 5 can be provided with screw threads 43 running in the direction of rotation of the runners, and this screw thread functions as a means to roughen the inner surface of the body 5, so as to increase contact of material flowing through the chamber 42 with metal surface. It is also understood that the surfaces of the impellers are more or less of a rough nature, in that, these impellers are formed from castings of the type which tend to form a relatively rough surface.

In operation of the machine the stock is supplied to the intake head 11 in the manner heretofore described, and this liquid has imparted thereto a rotative motion and enters into the runners through the axial opening of the divisional plate 17. The runners in turn impart high rotary movement to the liquid or stock by means of their blades 36.

Stock entering the field of the initial runner 28 under a constant rate of rotation of, for example 1200 revolutions per minute, will result in a pressure (created by centrifugal force) of approximately 45# p. s. i. on the cylindrical body 5, while in the axial passageway past the side baffle plates 37 and 38, the hydrostatic pressure will be approximately 4# p. s. i.

Under the above conditions, the stock moves radially toward the periphery of each runner under rotation to make a close 180 degree turn around the periphery of the central circular baffle plate 34 with the material of higher specific gravity breaking tangentially in the slots 39 toward the chamber 42, as shown, while the material of lower specific gravity moves toward the axis between the central baffle plates 34 and a side baffle plate 37 to make another 180 degree turn around the side baffle plate 37 entering the nearest adjacent runner, with a repeat performance through each succeeding runner 28 with discharge of lower specific gravity material finally to compartment 21 of the discharge head 12, and then discharge of material of higher specific gravity to and through chamber 42, discharging finally into the outer chamber 22, it being understood, of course, that the material of low specific gravity also flows through the openings 41 in the central baffle plates 34 of the runners. It is to be noted that the passage area between the periphery of the central baffle plate 34 and the inside periphery of the cylindrical body 5 is restricted, but of circumferential length. This provides for a thin section of the liquid passing this point and reduces the transverse distance which the heavier material is forced to travel to reach the outer periphery of the liquid as it makes the 180 degree turn across the periphery of the central baffle plate 34, where it is ejected tangentially through the slot 39 into the chamber 42. The removal of objectionable material, such as asphalt, etc., which is prevalent is converted paper stock, and shivy material from mechanical pulp which may have passed the paper making screens, may be in greater part accomplished by the frictional adhesion of such material to the metal surface of the runners and the inner periphery of the body 5. It will be noted that the liquid after passing the baffle 34 passes toward the axis to return radialy to the periphery in pressure contact with the inner surface of the baffle plates 37 and 38.

Objectionable material, such as asphalt, shives, etc., may be of equal specific gravity as the acceptable paper stock, however, having an affinity for metal surface under pressure contact, it tends to adhere thereto sufficiently to effect a separation, and in its travel to and over the baffle plates 37 and 38, the contact surface of the travelling liquid with the baffle plates becomes the outer periphery of the section of liquid as it passes around a central baffle plate 34 and is therefore in position for the tangential break at 39.

It will be understood that the inside periphery of the intake head 11, as well as the inside periphery of the cylindrical body 5 also provide metal contact surface. The machine thread on the inside periphery of the body 5 is also effective in shive removal as well as materially increasing the area of metal surface for contact with the paper stock or pulp.

If desired a valve controlled supply pipe 44 can communicate with the interior of the body 5 for delivering water or other liquid thereto, to insure a proper amount of liquid in the body for the discharge of material of high specific gravity and for insuring the complete submerging of the runners in liquid to steady the rotation thereof.

Changes in details may be made without departing from the spirit or the scope of this invention, but what is claimed as new is:

1. A device for continuously separating materials in liquid suspension comprising a body, an intake head at one end of the body, a discharge head at the opposite end of the body having an inner chamber and an outer chamber, rotatable runners in the body for rapidly rotating the liquid therein, said intake head and body having a restricted axial communication, a shaft for rotating the runners, and means on said shaft in addition to said runners arranged in said intake head for initially imparting rotation to the liquid in the same direction as the rotation of the runners at a point adjacent the communication of the inner chamber of said discharge head.

2. A device for continuously separating materials having different specific gravities in liquid suspension and of separating materials of substantially equal specific gravities but with one material having a greater affinity for metal surface under pressure contact than the other comprising a body, an intake head at one end of the body, a discharge head at the opposite end of the body having inner and outer chambers, a longitudinally extending shaft extending through the body and heads, means for rotating the shaft, a plurality of runners secured to the shaft for rotation therewith for rapidly rotating liquid in the body, each of said runners including a rim having side baffle plates gradually converging toward their extreme outer edge, and a centrally disposed disc shaped baffle plate disposed between the side baffle plates of the rim, the central baffle plates having axial passageways therethrough, said runners being provided with a roughened surface the inner edges of adjacent side baffle plates of the runners being arranged in abutting relation to define a tortuous passageway through the runners for the liquid, said body and intake head having communication for liquid with the runner adjacent to said intake head, the inner chamber of the discharge head having communication with the interior of the runner adjacent thereto, the body having communication with the outer chamber of the discharge head beyond said rims, all of the runners having annular discharge slots at the juncture of the side baffle plates of the rim.

3. A device for continuously separating materials in liquid suspension as defined in claim 2, and the inner surface of said body being provided with a screw thread.

4. A device for continuously separating materials in liquid suspension as defined in claim 2, and said runners also including blades connecting the central baffle plate and the side baffle plates of the rims.

5. A device for continuously separating materials in liquid suspension as defined in claim 1, and said intake head having a tangentially extending inlet opening for stock to lead the stock in said head in the direction of rotation of the runners and the means in the head for initially imparting rotation to the liquid and against said means.

References Cited in the file of this patent
FOREIGN PATENTS 17,384    Great Britain _____ July 26, 1912